United States Patent
Andelman

[19]
[11] Patent Number: 6,127,474
[45] Date of Patent: Oct. 3, 2000

[54] STRENGTHENED CONDUCTIVE POLYMER STABILIZED ELECTRODE COMPOSITION AND METHOD OF PREPARING

[76] Inventor: Marc D. Andelman, One Parkton Ave., Worcester, Mass. 01605

[21] Appl. No.: 08/921,738

[22] Filed: Aug. 27, 1997

[51] Int. Cl.[7] .................................................. C08K 3/00
[52] U.S. Cl. ............................. 524/495; 524/496
[58] Field of Search ..................... 524/495, 496

[56] References Cited

U.S. PATENT DOCUMENTS

| | | | |
|---|---|---|---|
| 3,838,092 | 9/1974 | Vogt et al. | 260/33.6 F |
| 3,864,124 | 2/1975 | Breton et al. | 75/212 |
| 3,993,584 | 11/1976 | Owen et al. | 252/383 |
| 4,194,040 | 3/1980 | Breton et al. | 428/308 |
| 4,320,184 | 3/1982 | Bernstein et al. | 429/217 |
| 4,337,140 | 6/1982 | Solomon | 204/292 |
| 4,354,958 | 10/1982 | Solomon | 252/425.3 |
| 4,379,772 | 4/1983 | Solomon et al. | 264/49 |
| 4,664,683 | 5/1987 | Degen et al. | 55/387 |
| 4,945,125 | 7/1990 | Dillon et al. | 527/427 |
| 5,019,311 | 5/1991 | Koslow | 264/122 |
| 5,147,722 | 9/1992 | Koslow | 428/402 |
| 5,187,320 | 2/1993 | Yunan | 102/275.8 |
| 5,189,092 | 2/1993 | Koslow | 524/495 |
| 5,249,948 | 10/1993 | Koslow | 425/376.1 |
| 5,331,037 | 7/1994 | Koslow | 524/496 |
| 5,620,597 | 4/1997 | Andelman | 210/198.2 |

OTHER PUBLICATIONS

"Advances in Chemistry Series", USA 1969; Robert F. Gould, Editor, p. 13 entitled, "A Novel Electrode" by H.P. Landi, J.D. Voohies and W.A. Barber Month N/A.

*Primary Examiner*—Edward J. Cain
*Attorney, Agent, or Firm*—Richard P. Crowley

[57] ABSTRACT

A high tensile strength, fluorocarbon-conductive, particle binder material useful as electrodes in a flow-through capacitor. The material comprises electrodes formed from fibrillated fine fibers, conductive carbon particles and a small amount of a polymeric binder. The method includes admixing the materials, fibrillating the polymers, and extruding the material to electrode forms.

24 Claims, No Drawings

STRENGTHENED CONDUCTIVE POLYMER STABILIZED ELECTRODE COMPOSITION AND METHOD OF PREPARING

BACKGROUND OF THE INVENTION

Powder materials held together into monoliths with fibrillatable polymers, such as, or most typically, polytetrafluoroethylene (PTFE), but also any other fibrillatable polymers, such as, polypropylene, can be strengthened by the addition of a strengthening cross-connected binder, without the necessity of sintering the primary particles themselves. The result is a ternary system of fibrillatable PTFE, powder material, and strengthened cross-connected binder. A cross-connectable binder is any material which can fuse to itself, including thermoplastic fibers, thermoplastic materials, viscoelastic materials, such as, natural or synthetic rubbers, and any liquid resin or resin combination, such as epoxies and urethanes, that can be cured in situ, either chemically, thermally, by radiation or light, acoustically, or by any other means to form a cross-connected strengthening matrix. Such cross-connecting binders may be heat-fusible thermoplastics as listed in U.S. Pat. No. 5,147,722, columns 7–8, Section C, Binder Materials, and incorporated by reference. Such binders may also include a mixture of silicone elastomers and catalysts as listed in U.S. Pat. No. 4,945,125 and incorporated by reference.

Fibrillatable polymers, particularly fluoropolymers, especially brands of polytetrafluoroethylene (PTFE), known as Teflon, have been extensively described as particle stabilizing agents. The application of shear to mixtures of Teflon and carbon particles form an interconnecting spider web of Teflon fibers which holds the particles together. Such fibers are very narrow, often less than 10 micrometers in diameter. This allows the fibrillated polymer to hold together very small, dust-like particles, which get caught in the spider web-like PTFE filaments. Fibrillatable polymers, such as PTFE, but also polypropylene, can be used to form monoliths or preforms. For example, U.S. Pat. Nos. 4,379,772 and 4,354,958 describe fibrillated PTFE used to bind carbon particles to form sheet electrode material. U.S. Pat. No. 3,993,584 describes general processes for binding together many other different types of particles.

A problem with this method to form sheets or monoliths is that the resultant material is soft in nature and easily torn or broken. PTFE is a weak material, that while excellent at agglomerating particles into an immobilized matrix, provides an easily torn or broken monolithic structure. This makes resultant material more expensive to manufacture, process, handle, and fabricate into other products. For example, winding capacitors, from carbon sheet material, made from fibrillated PTFE and carbon powder requires a minimum tensile strength.

U.S. Pat. Nos. 4,194,040, and 3,864,124 describe the use of fibrillated PTFE to hold together sinterable particles in preforms, which are later sintered together during further processing.

U.S. Pat. No. 5,187,320 describes the use of PTFE to add additional strength to a nitrocellulose binder and high explosive mixture. U.S. Pat. No. 4,337,140, issued Jun. 29, 1982, entitled "STRENGTHENING OF CARBON BLACK-TEFLON-CONTAINING ELECTRODES", describes the use of PTFE to strengthen fibrillated PTFE in carbon particle sheet material.

H. P. Landi, J. D. Voorhies, and W. A. Barber's, "Advances in Chemistry Series", 1969; Robert F. Gould, Editor, page 13, entitled, "A Novel Air Electrode", describes a fiberized, PTFE, carbon powder electrode manufactured with a thermoplastic molding compound that is later extracted.

SUMMARY OF THE INVENTION

The invention relates to polymer stabilized particle compositions, electrodes prepared therefrom and to the method of manufacture and use of such compositions and electrodes.

The invention comprises a high tensile strength, electrically-conductive, particle-containing composition, adapted for use as an electrode material, for example, in a flow-through capacitor, useful in a chromatographic system and which composition comprises:

a) a sufficient amount of a fibrillatable and fibrillated polymer, like a fluorocarbon or an olefinic polymer, for example, in an amount from about 0.1 to 5.0 percent by weight of the composition, and sufficient to act in fibrillated very fine fiber form, e.g., with an average fiber diameter of less than 10 micrometers, as a particle stabilizer agent in the composition;

b) over about 90 percent by weight, e.g., 90 to 99% by weight, of the composition of a fine particle material, e.g., typically less than 100 microns, particle size, e.g. 5–50 microns, which includes or comprises a sufficient amount of electrically-conductive particles, alone or admixed with other particles to impart desired electrical conductivity to the composition, for example, conductive particles comprising conductive carbon black or a mixture of conductive carbon black and activated carbon particles; and c) about 0.01 to 10 percent by weight, for example, 0.1 to 2 percent by weight, of the composition of a cross-connectable, thermoplastic polymer binder material, the composition having a tensile strength after formation and fibrillization of greater than about 0.05 kilograms-centimeters (kg-cm), and for example, from 1.0 or more, and comprising an interconnected spider web of the fine, fibrillated, polymer fibers to retain the particle materials in the web and a cross-connected, thermoplastic, binder polymer to reinforce the fibrillated, spider web polymer and particle materials.

The composition may include cross-linkable, polymeric additives as well as, for example, the addition of natural or synthetic fibrous materials; such as, but not limited to, thermoplastic fibers, in an amount, for example, up to 10 to 15 percent by weight of the composition. The composition also may require such other additives in minor amounts; such as, fillers; metal oxides; fibers, such as, conductive fibers; plasticizers; anti-oxidants; processing extrusion; milling and mixing additives; pigments; surf actants; Quaternary ammonium compounds; dispersing agents; polymerizing initiator agents; curing agents; promoters and other additives, as required. The composition may include water, oils or other liquids, for example, glycols, to aid in the wet processing and admixture of the composition into its fibrillated, spider web composition form.

In one preferred embodiment, the composition comprises a fibrillatable, fluorocarbon polymer, like PTFE, a conductive, carbon black particle, alone or with a mixture of activated carbon, e.g., 10 to 90 percent by weight, with a particle size of less than about 50 microns, and a polymeric, thermoplastic binding material.

The method of preparing the composition into an electrically conductive material, in various forms, more particularly, for use as an electrode in flow-through capacitors, comprises admixing in a mixer the ingredients of the composition together, either alone in dry form, or more typically in wet form, in the presence of water or other liquid and under shear conditions, and typically with the use of heat and pressure to fibrillate the fibrillatable polymer into fibrillated fibers of generally less than 50 micrometers in average diameter, in order to form a spider web conglomerate and to disperse the particle materials, including the conductive particles, generally uniformly, throughout the composition and to provide an interlocking, thermoplastic, polymer binder material throughout the resulting admixed, sheared composition. The method also includes, thereafter, processing the admixed, fibrillated composition, typically under sufficient heat to render the composition softenable and extrudable through an extruding press, calendar, or other equipment, in order to form the fibrillated composition into a suitable form; such as, for electrodes, e.g., into a sheet material having a thickness of from about 1 to 30 mils thick. Generally the extrusion is carried out under sufficient heat and pressure to press the fibers together into a cross-link mesh within the fibrillated composition. After extrusion or forming into the desired shape, the extruded or desired shape may be subsequently treated or otherwise processed into the useful end form and shape desired.

A fibrous web's ability to bind together particles is analogous to how a filter works. The individual web strands work best when they are thinner than the particles being bound. Finer web strands are better at binding particles, particularly small particles. However, such fine strands tend to produce a weak monolithic material. Fibrillatable PTFE can form strands that are extremely thin when compared to other polymer fibers. For example, when sheared and mixed, it is possible to produce strands of 0.01 or even 0.001 microns or less. Materials other than fibrillatable PTFE polymers tend to form thick strands and fibers. In the present invention, these thicker strands and fibers are used to form a cross-woven web or cross-connected matrix which adds strength to the monolith. The PTFE is used to immobilize the particles. The ternary combination of small particles, within the two different binder systems, allows the use of a low binder concentration, for example, less than 10 percent, such as, 5 percent by weight, to the fibrillatable polymer system, and only that amount of other binder material needed to provide strength and tensile strength. It is desirable to have a tensile strength above 0.05 kg-cm, preferably, above 0.09 kg-cm. Even higher tensile strength is very desirable for ease of processing or manufacturing into electrodes.

None of these references describe the ternary combination of non-sinterable or non-sintered powder material held together with fibrillatable polymers, most typically PTFE, where the PTFE is used to stabilize and hold together a powder mixture, but where additional strength comes from a third cross-connected binder component.

U.S. Pat. Nos. 5,187,320 and 4,337,140 describe the use of PTFE itself as the strength forming agent. U.S. Pat. No. 4,337,140 utilizes additional fibers, although in the form of added PTFE fibers. These cannot be easily melted during a mixing or shape forming stage to provide processing strength in order to aid manufacture, and cannot easily be thermally or chemically bonded into a strong, cross-connected, reinforcing structure. Sintering PTFE requires high heat which is detrimental to many particle systems.

U.S. Pat. No. 5,187,320 describes the use of a three component system of PTFE, nitrocellulose binder, and plastic explosives. However, the strength is generated by the PTFE itself.

The use of non-PTFE binder materials by themselves, without PTFE or a fibrillatable polymer present, in order to bind powder material into monoliths, is common. Binder systems, including ceramic, latex, curable resins, and various heat processible plastics, are known. Such binder systems produce strong monoliths and generally require more binder than fibrillated PTFE. Added binder affects the bulk properties of the primary particle material, such as absorption, conductivity, etc.

The use of thermoplastic or viscoelastic material, such as latex, rubber, or curable resins, alone to form monoliths from powdered material is common. For example, U.S. Pat. Nos. 4,664,683 (Degen et al), and 5,019,311, 5,147,722, 5,249,948, 5,331,037, and 5,189,092 (all Evan Koslow), describe the use of thermally-bondable plastic and plastic fibers to form monoliths from powder material. The binders in these patents, incorporated by reference, can all be utilized in generally lesser amounts, if they are utilized in combination with PTFE, so that these non-PTFE materials are used only as the strengthening binder in the present invention, rather than as both the immobilization binder and the strengthening binder.

Binder systems, other than fibrillated PTFE, generally require more binders to hold powder material together into a monolith, that is, because PTFE forms generally finer fibers, and can therefore hold particles together more efficiently. PTFE fibrils are typically less than 10 micrometers in diameter. On the other hand, thermoplastic fibers tend to be larger than fibrillatable PTFE. In U.S. Pat. No. 5,147,722, column 43, line 32, Koslow claims that such thermoplastics are incapable of forming fibers less than 10 micrometers in diameter. Further, in column 43, line 24, Koslow claims 3 to 30 percent by weight, of a thermoplastic binder and in lines 46 to 47, 4 to 8 percent. High binder content is undesirable, in that it affects bulk properties of the powder material, such as, particles surface area, absorption ability, etc. Moreover, binder systems other than fibrillated PTFE, tend to fill in voids of the particle material. In U.S. Pat. No. 5,147,722 column 43, lines 40–44, Koslow describes the binder material forced into macropores and exterior voids of the individual primary particles, which is undesirable, in that it blocks the macropores, thereby affecting the bulk properties of the primary particles, such as, surface area and absorption ability. In contrast, PTFE fibrils do not fill in voids of the particles, but rather, form an interconnecting spider web of fine filaments. The bulk properties of such a fibrillated PTFE, immobilized, powder system are virtually unaffected. The fine spider web in fibrillized PTFE filaments hold small particles together without undue interaction with the particles themselves. The thin fibers of PTFE generally allow much lower binder concentrations than other binder systems. U.S. Pat. No. 3,838,092, column 1, lines 33–35, describes the amount of fibrillated PTFE needed to agglomerate particles as between 0.02 to less than 1% by weight. Likewise, U.S. Pat. No. 4,320,184, column 3, lines 34–35, describes a PTFE-carbon, electrode sheet material 0.5 to 5 percent, or typically 1 to 2 percent PTFE in this application.

Low binder concentration is essential to maintain important properties, such as, electrical conductivity (where the composition is used as electrode material in flow-through capacitors), surface area, absorption ability, etc. of the powder material which forms the monolith. PTFE works in very low concentrations, often using 5 percent or less fibrillated PTFE to bond together a powder mixture. U.S. Pat. No. 3,993,584, column 5, lines 8 to 21 discloses the fibrillatable PTFE used to immobilize powder in concentrations from 0.02 to 1 percent by weight. This is extremely low for a binder system; however, such mixtures are very weak and exhibit poor tensile strength when formed into sheets or rods.

Tensile strength is important, not only to manufacture the material economically, but also for the handling of the material in subsequent fabrication steps. For example, tensile strength is needed in order to manufacture efficiently flow-through capacitors from carbon sheet material, either by winding or pleating sheets together. A stronger material also holds together better when forming other shapes, such as, extruded or molded rods or tubes. Such rods or tubes may be further processed by sawing, skiving into sheets, or cutting with an ordinary meat slicer into disks and rings. Therefore, addition of a ternary binder to a fibrillated PTFE-powder mixture can add strength. Since the particles of powder are already immobilized, only that amount of ternary binder need be added which is required to impart selected tensile strength, for example, greater than 0.05 kg-cm, such as, 1.0 kg-cm, therefore keeping the total binder concentration low. Such a ternary binder may either bond to itself, or to the particle materials themselves via forced point bonds; however, in many cases it is preferable that the binder material bond to itself, so as not to interfere with bulk particle properties.

Due to the ability of fibrillatable PTFE to form small strands that hold very fine particles together, the ternary binder system of the invention allows for the use of smaller particle sizes, such as below 30 microns in monoliths, yet also allows greater strength than PTFE alone. For example, small particle sizes, such as below 30 microns, are important for such factors as absorption kinetics in filters for gas and liquid separations, as well as for better electrical properties for use in electrodes for double layer capacitors, flow-through capacitors, and fuel cells. Powder materials formed into monoliths according to the invention may be in sheet, rod, tube, or other forms, and may use activated carbon, zeolites, silica, ion exchange particles, calcium carbonate, or any other absorbent or supported catalyst material where faster absorption, desorption, or reaction kinetics are desired, or where better use of material and compactness are desired. Fine powder absorbent, catalyst or zeolite material formed into monoliths according to the invention may be used in catalytic cracking of hydrocarbons, or as liquid, water or air filters.

DESCRIPTION OF THE EMBODIMENTS

Example 1

Activated Carbon Sheet Electrodes
3 percent by weight, fibrillatable PTFE, like Dupont Teflon K; 10 percent by weight, conductive carbon black, such as, Cabot XR72;
84 percent by weight, activated carbon powder, less than 100 microns particle size; and
3 percent of any thermoplastic fibers, such as polyolefin, nylon, or 3 denier, ¾ inch long polypropylene fibers from Amoco.

Said mixture is worked either dry or with enough water to wet in a mixer that provides sufficient shear to fibrillate the Teflon fibers and agglomerate the particles. The resultant mixture is fed through a mill, and thence through an oil-heated calendar, heated to above the softening point of the thermoplastic fibers; for example, 275 to 400° F., such as 320°. The material is calendared into a sheet 20 mils thick. The heat binds the fibers together into a cross-linked mesh, thereby lending strength to the sheet material. Alternatively, the heat used to soften the thermoplastic may be provided in the mixing stage, and ordinary steam-heated calendars may be used to press the fibers together into a cross-linked mesh.

Example 2

0.5 to 5 percent fibrillatable PTFE;
90 to 99 percent fine powder material; and
0.5 to 10 percent thermoplastic binder.

Said mixture is heated, while undergoing shear and/or pressure, to fiberize the PTFE, and to disperse the thermoplastic binder. The resultant mixture is subsequently extruded into rods, tubes or sheets, or may be hot pressed, calendared, milled, or rolled into various sheet, rod, tube forms, or other shapes. Resultant rod or tube forms may be subsequently longitudinally skived into sheets, or cut cross-ways into disks or rings with an ordinary meat slicing machine. Sheets, tubes or rods may be used as filters for air, liquid or gas. Fine powder material may be activated carbon for use in carbon block filters used to filter water, liquid or gas.

Example 3

3 percent PTFE by weight;
84 percent activated carbon particle size less than 30 microns;
10 percent by weight conductive carbon black, such as, Cabot XR72;
3 percent by weight synthetic rubber; and
1.5 times the above weight in water.

The above materials are mixed under heat and shear in an internal mixer, such as, a Banbury, Pin mixer, Ball mill, etc. Enough heat is generated during mixing to melt and disperse the rubber. The resultant mixture is then put through a roll mill, and then through a calendar set to manufacture a 20 mil thick sheet. As the sheet material comes off of the calendar, it is put onto various backings, including disposable plastic, capacitor spacer material, or conductive backing material, including graphite foil.

Example 4

2 percent PTFE by weight;
96 percent powder material;
2 percent silicone elastomer; sufficient catalyst to cure the silicone elastomer; and
2 times the above weight in water.

Above mixture is mixed under heat and sufficient shear to fibrillate the mixture, and subsequently extruded, milled or calendared into 20 mil thick sheets. Alternatively, an extruder can be used to feed a mill or calendar.

Example 5

2 percent PTFE by weight; and
92 percent activated carbon powder by weight.

The mixture is dry mixed in an internal mixer to provide sufficient shear to fibrillate the PTFE and agglomerate the carbon particles. After the initial mixing step, 6 percent by weight, of a liquid resin, such as two part polyurethane, is added and folded in under low shear. The resultant mixture is hot pressed or calendared into sheets for use as flow-through capacitor electrodes.

Example 6

A mixture of 80 percent activated carbon powder, surface area 1000 to 1500 meters/gram or more, 10 micron particle size, was mixed with 10 percent conductive carbon black, such as, Cabot XR72, and 3 percent fibrillatable PTFE, such as, Teflon 6C from Dupont, and 7 percent, 10 micron particle size polypropylene, is mixed with an equal weight of water in any shear providing mixer, such as a Banbury, Pin Mixer, Ball Mill, or Pomini adjustable shear mixer. A multiple screw extruder, Pin mixer, or other continuous mixer may also be used.

Heat generated during mixing brings the temperature to 100° C. The resulting dough-like material is subsequently ground up into particles and compression-molded, or fed directly into roll mills, calendars, or extruders to form a 20 mil thick sheet. This sheet is greater in tensile strength than 1 kg-cm, and is rolled up around a tube for shipping. These rolls are then put upon a spindle and drawn off to form anode and cathode layers of spiral wound or pleated capacitors. Backing layers of metal or graphite foil are interwoven between facing, carbon sheet layers to form a conductive backing, in order to form anode and cathode layers, as in, for example U.S. Pat. No. 5,620,597, incorporated by reference. Spacer layers of a non-electronically, conductive material are interwoven between the anode and cathode layers. The resulting spiral or stacked and pleated capacitor may be put into a cartridge for use as a flow-through capacitor for the operation or concentration of ionic solutions, like salt or metal water solutions. The flow-through capacitor may be used to purify liquids or gases. Alternatively, this capacitor may be filled with various organic or inorganic electrolytes for use as an energy storage capacitor. Typical electrodes for flow-through capacitors would have a resistivity of 1 to 10 ohm-cm or less.

Example 7

A mixture of 90 percent platinum coated activated 10 micron carbon powder, surface area 3000 meters/gram, is mixed with 5 percent fibrillatable PTFE, 5 percent 100 micron polypropylene powder, and an equal weight of water. Sufficient shear is provided in any shear providing mixer to fibrillate the PTFE. Heat generated in the mixer melts the polypropylene. The mixture is subsequently extruded, calendared, or formed into various sheets, tubes, rods or other shapes. Upon cooling, the polypropylene forms a cross-connected strengthened web. Rolled sheets or simple tubes and rods of this material are placed in a flow cartridge for use on automobiles to catalytically break down carbon monoxide gases.

What is claimed is:

1. A high tensile strength particle composition, for use as electrodes, filters or supported catalyst, and which composition comprises:
    a) up to about 5.0 percent by weight of the composition of a thermoplastic fibrillatable polymer, in fibrillated fiber form, in an amount sufficient to act as a particle stabilizing agent in the polymer;
    b) over about 90 percent by weight of the composition of a fine particle material, including a sufficient amount of electrically-conductive particles, to impart electrical conductivity to the composition; and
    c) up to about 10 percent by weight of the composition of a thermoplastic, polymer binder material, the composition having a tensile strength of greater than about 0.05 kg-cm, after admixture and fibrillation, and having an interconnected spider web of fine, fibrillated, polymer fibers to retain the particle material, generally uniformly dispersed throughout the composition, and a thermoplastic, binder material to reinforce the fibrillated polymer and particle materials.

2. The composition of claim 1 wherein the fibrillated, polymer material is selected from a group consisting of a fluorocarbon polymer, an olefinic polymer, and combinations thereof.

3. The composition of claim 1 wherein the fibrillated, polymer material comprises a polytetrafluoroethylene polymer.

4. The composition of claim 1 wherein the fine particles of the composition have a particle size of less than about 100 microns.

5. The composition of claim 1 wherein the fine particles include conductive, carbon black particles or a mixture of conductive, carbon black particles and activated carbon particles.

6. The composition of claim 1 wherein the thermoplastic, polymer, binder material comprises from about 0.1 to 2 percent by weight of the composition.

7. The composition of claim 1 wherein the thermoplastic, polymer, binder material is selected from a group consisting of polyamide, polyolefin, and polyurethane, synthetic rubber, silicon, elastomeric polymer and combinations thereof.

8. The composition of claim 1 which includes up to about 15 percent by weight of the composition of a fibrous thermoplastic material.

9. The composition of claim 1 which includes up to about 1.5 times the weight of the composition of a liquid processing aid.

10. The composition of claim 9 wherein the liquid processing aid comprises water.

11. The method of preparing a high strength composition suitable for use as electrodes, filters or supported catalyst, and which method comprises:
    a) the mixing together as a high tensile strength composition:
        i) up to about 5.0 percent by weight of the composition of a thermoplastic fibrillatable polymer, in an amount sufficient to act as a particle stabilizing agent in the polymer;
        ii) over about 90 percent by weight of the composition of a fine, particle material including a sufficient amount of electrically-conductive particles, to impart electrical conductivity to the composition; and
        iii) up to about 10 percent by weight of the composition of a thermoplastic, polymer binder material, the composition having a tensile strength of greater than about 0.05 kg-cm, after admixture and fibrillation;
    b) subjecting said composition to sufficient shear under heat and pressure conditions to fibrillate the fibrillatable polymer and to form the fine fibers of less than about 10 micrometers in diameter and a spider web of the fibrillated, fine, fibers of the polymer and to disperse uniformly the electrically conducted particles in the fine spider web and to provide a uniform dispersement of the thermoplastic, binder material to reinforce the fibrillated fibers of the polymer and particle materials to provide a tensile strength of greater than about 0.05 kg-cm; and
    c) processing the fibrillated, admixed composition into a form suitable for use as an electrode material.

12. The method of claim 11 which includes employing a liquid processing aid with said composition to wet said composition during the admixture and fibrillation process.

13. The method of claim 11 which includes extruding the fibrillated, admixed composition under heat and pressure at about the softening point of the composition into a sheet form.

14. The method of claim 11 which includes admixing together the fibrillatable polymer and electrically-conductive particles and subsequently adding to said mixture a liquid, thermoplastic, binding material under lower shear conditions.

15. The method of claim 11 wherein the fine particle material includes electrically-conductive carbon black particles or a mixture of electrically-conductive carbon black particles and activated carbon particles having a particle size less than 100 microns.

16. The admixed, fibrillated, processed product produced by the method of claim 11.

17. The method of claim 11 wherein the fibrillated polymer comprises from about 0.1 to 5.0 percent by weight of the composition.

18. The method of claim 11 wherein the fibrillatable polymer comprises a fluorocarbon polymer with fibrillated fibers of less than about 10 micrometers in diameter.

19. The composition of claim 1 wherein the fibrillated fiber comprises strands of 0.01 microns or less.

20. The composition of claim 1 which comprises a sheet material of about 1 to 30 mils in thickness.

21. The composition of claim 19 wherein the thermoplastic, polymer binder material comprises a thermoplastic binder fiber with strands which are thicker in diameter than the strands of the fibrillated fiber.

22. The composition of claim 1 wherein the composition has a tensile strength of greater than about 0.09 kg-cm.

23. The composition of claim 1 wherein the fibrillatable polymer comprises a fluorocarbon and the thermoplastic, polymer binder material comprises polypropylene.

24. The composition of claim 1 wherein the fine particle material has a particle size of 5 to 50 microns.

* * * * *